(12) United States Patent
Motoki et al.

(10) Patent No.: US 9,123,469 B2
(45) Date of Patent: Sep. 1, 2015

(54) LAMINATED CERAMIC ELECTRONIC COMPONENT AND MANUFACTURING METHOD THEREFOR

(75) Inventors: Akihiro Motoki, Nagaokakyo (JP);
Syunsuke Takeuchi, Nagaokakyo (JP);
Makoto Ogawa, Nagaokakyo (JP);
Seiichi Nishihara, Nagaokakyo (JP);
Kenichi Kawasaki, Nagaokakyo (JP);
Shuji Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1098 days.

(21) Appl. No.: 13/050,977

(22) Filed: Mar. 18, 2011

(65) Prior Publication Data
US 2011/0234045 A1    Sep. 29, 2011

(30) Foreign Application Priority Data

Mar. 24, 2010  (JP) ................. 2010-067491

(51) Int. Cl.
*H01G 4/005* (2006.01)
*H01G 4/228* (2006.01)
*H01G 4/12* (2006.01)
*H01G 4/30* (2006.01)

(52) U.S. Cl.
CPC ................ *H01G 4/005* (2013.01); *H01G 4/12* (2013.01); *H01G 4/228* (2013.01); *H01G 4/30* (2013.01)

(58) Field of Classification Search
CPC ........... H01G 4/30; H01G 4/232; H01G 4/12; H01G 4/228; H01G 4/2325; H01G 4/005; H01G 4/012
USPC .................. 361/306.3, 303, 301.4
See application file for complete search history.

(56) References Cited

U.S. PATENT DOCUMENTS 6,960,366 B2  11/2005  Ritter et al.
6,972,942 B2  12/2005  Ritter et al.
(Continued)

FOREIGN PATENT DOCUMENTS

JP     2000-77258 A     3/2000
JP     2004-186602 A    7/2004
(Continued)

OTHER PUBLICATIONS

Motoki et al.; "Multilayer Electronic Component and Method for Manufacturing the Same"; U.S. Appl. No. 12/110,484, filed Apr. 28, 2008.

(Continued)

*Primary Examiner* — Dion R Ferguson
(74) *Attorney, Agent, or Firm* — Keating & Bennett, LLP

(57) ABSTRACT

In a method of forming a plating layer for an external terminal electrode by applying, for example, copper plating to an end surface of a component main body with respective ends of internal electrodes exposed, and then applying a heat treatment at a temperature of about 1000° C. or more in order to improve the adhesion strength and moisture resistance of the external terminal electrode, the plating layer may be partially melted to decrease the bonding strength of the plating layer. In the step of applying a heat treatment at a temperature of about 1000° C. or more to a component main body with plating layers formed thereon, the average rate of temperature increase from room temperature to the temperature of about 1000° C. or more is set to about 100° C./minute or more. This average rate of temperature increase maintains a moderate eutectic state in the plating layer and ensures a sufficient bonding strength of the plating layer.

3 Claims, 4 Drawing Sheets

(56) References Cited

U.S. PATENT DOCUMENTS

| | | | |
|---|---|---|---|
| 6,982,863 | B2 | 1/2006 | Galvagni et al. |
| 7,067,172 | B2 | 6/2006 | Ritter et al. |
| 7,152,291 | B2 | 12/2006 | Ritter et al. |
| 7,154,374 | B2 | 12/2006 | Ritter et al. |
| 7,161,794 | B2 | 1/2007 | Galvagni et al. |
| 7,177,137 | B2 | 2/2007 | Ritter et al. |
| 7,344,981 | B2 | 3/2008 | Ritter et al. |
| 7,345,868 | B2 | 3/2008 | Trinh |
| 7,463,474 | B2 | 12/2008 | Ritter et al. |
| 7,580,240 | B2 * | 8/2009 | Yamamoto et al. ........... 361/311 |
| 2005/0046536 | A1 | 3/2005 | Ritter et al. |
| 2007/0014075 | A1 | 1/2007 | Ritter et al. |
| 2008/0123248 | A1 | 5/2008 | Kunishi et al. |
| 2008/0123249 | A1 | 5/2008 | Kunishi et al. |
| 2008/0158774 | A1 | 7/2008 | Trinh |
| 2008/0210564 | A1 | 9/2008 | Motoki et al. |
| 2008/0239617 | A1 | 10/2008 | Motoki et al. |
| 2009/0268374 | A1 * | 10/2009 | Motoki et al. ............. 361/321.2 |

FOREIGN PATENT DOCUMENTS

| | | |
|---|---|---|
| JP | 2008-283170 A | 11/2008 |
| WO | 2008/059666 A1 | 5/2008 |

OTHER PUBLICATIONS

Motoki et al.; "Multilayer Ceramic Electronic Component and Method for Manufacturing the same"; U.S. Appl. No. 12/356,648, filed Jan. 21, 2009.

Iwanaga et al.; "Monolithic Ceramic Electronic Component and Method for Manufacturing the Same"; U.S. Appl. No. 12/405,370, filed Mar. 17, 2009.

Iwanaga et al.; "Multilayer Ceramic Electronic Component and Method for Producing Same"; U.S. Appl. No. 12/405,372, filed Mar. 17, 2009.

Kayatani et al.; "Multilayer Ceramic Electronic Component and Method for Making the Same"; U.S. Appl. No. 12/469,799, filed May 21, 2009.

Takeuchi et al.; "Multilayer Ceramic Electronic Component and Manufacturing Method Thereof"; U.S. Appl. No. 12/340,570, filed Dec. 19, 2008.

Kobayashi et al.; "Multilayer Ceramic Electronic Component and Method for Making the Same"; U.S. Appl. No. 12/490,471, filed Jun. 24, 2009.

Nishihara et al.; "Laminated Ceramic Electronic Component and Manufacturing Method Thereof"; U.S. Appl. No. 12/617,879, filed Nov. 13, 2009.

Takeuchi et al.; "Multilayer Electronic Component and Method for Manufacturing the Same"; U.S. Appl. No. 12/817,352, filed Jun. 17, 2010.

Saruban et al.; "Laminated Ceramic Electronic Component and Manufactruing Method Therefor"; U.S. Appl. No. 12/821,305, filed Jun. 23, 2010.

Official Communication issued in corresponding Japanese Patent Application No. 2014-012876, mailed on Sep. 24, 2014.

* cited by examiner ated ceramic electronic component and a manufacturing method therefor, and more particularly, relates to a laminated ceramic electronic component which has an external terminal electrode formed directly by plating so as to be electrically connected to an internal electrode, and a method for manufacturing the laminated ceramic electronic component.

2. Description of the Related Art

As shown in FIG. 3, a laminated ceramic electronic component 101 as typified by a laminated ceramic capacitor includes a component main body 105 including a stack structure including a plurality of stacked ceramic layers 102 made of, for example, a dielectric ceramic, and including a plurality of layered internal electrodes 103 and 104 disposed along the interfaces between the ceramic layers 102. The ends of the plurality of internal electrodes 103 and the ends of the plurality of internal electrodes 104 are respectively exposed at end surfaces 106 and 107 of the component main body 105, and external terminal electrodes 108 and 109 are arranged respectively so that the respective ends of the internal electrodes 103 and the respective ends of the internal electrodes 104 are electrically connected to each other.

For the formation of the external terminal electrodes 108 and 109, typically, a metal paste including a metal constituent and a glass constituent is applied onto the end surfaces 106 and 107 of the component main body 105, and then fired to form paste electrode layers 110. Next, first plating layers 111 including, for example, nickel as their main constituent are formed on the paste electrode layers 110, and second plating layers 112 including, for example, tin or gold as their main constituent are formed on the first plating layers 111. More specifically, each of the external terminal electrodes 108 and 109 includes a three-layer structure of the paste electrode layer 110, the first plating layer 111, and the second plating layer 112.

The external terminal electrodes 108 and 109 are required to provide favorable solderability when the laminated ceramic electronic component 101 is mounted on a substrate using solder. At the same time, the external terminal electrode 108 is required to electrically connect the plurality of internal electrodes 103 to each other, which are electrically insulated from each other, and the external terminal electrode 109 is required to electrically connect the plurality of internal electrodes 104 to each other, which are electrically insulated from each other. The second plating layer 112 ensures solderability, and the paste electrode layer 110 electrically connects the internal electrodes 103 and 104 to each other. The first plating layer 111 prevents solder leach in the solder joint.

However, the paste electrode layers 110 each have an increased thickness of several tens of micrometers to several hundreds of micrometers. Therefore, in order to provide the dimensions of the laminated ceramic electronic component 101 within certain specifications, there is need to reduce the effective volume for providing the capacitance, because the volume of the paste electrode layers 110 must be provided. On the other hand, the plating layers 111 and 112 each have a thickness on the order of several micrometers. Thus, if the external terminal electrodes 108 and 109 can be made only of the first plating layer 111 and the second plating layer 112, the effective volume for providing the capacitance can be increased.

For example, International Publication No. 2008/059666 discloses plating layers defining external terminal electrodes, which are formed directly on end surfaces of a component main body. Furthermore, International Publication No. 2008/059666 also discloses the formation of interdiffusion regions in boundary sections between internal electrodes and the plating layers by performing a heat treatment after the formation of the plating layers.

Therefore, the application of this conventional art produces a volume expansion of the metal in the interdiffusion regions, which effectively fills gaps which may be present at the interfaces between the ceramic layers and each of the internal electrodes and external terminal electrodes, and advantageously prevents a plating solution in plating processing which may be performed subsequently and other moisture from penetrating into the component main body.

In addition, the application of this conventional art is expected to improve the bonding strength at the interfaces between the ceramic material of the ceramic layers stacked with the internal electrode therebetween and the plating layers in the component main body. Furthermore, when requiring an improvement of the bonding strength, it is believed that a heat treatment is preferably performed at a temperature of not less than 1000° C. which is the eutectic temperature of the metal defining the plating layers. For example, when forming a copper plating layer, it is believed that a heat treatment is preferably performed at a temperature of not less than 1000° C. which is close to the eutectic temperature of copper.

However, the heat treatment performed at a temperature of 1000° C. or more may encounter a problem of the copper being partially melted. As a result, when the laminated ceramic electronic component is mounted on a circuit board using solder, the bonding strength to the circuit board may be decreased.

In addition, when forming a plating layer, such as nickel on the copper plating layer, the adhesion force to the copper plating layer may be decreased.

SUMMARY OF THE INVENTION

To overcome the problems described above, preferred embodiments of the present invention provide a method for manufacturing a laminated ceramic electronic component in which the bonding strength between a plating layer and a component main body is maintained and a laminated ceramic electronic component manufactured in accordance with the manufacturing method.

A method for manufacturing a laminated ceramic electronic component according to a preferred embodiment of the preset invention preferably includes the steps of preparing a component main body including a plurality of stacked ceramic layers and internal electrodes formed therein, the internal electrodes being partially exposed, and forming an external terminal electrode on an outer surface of the component main body, the external terminal electrode being electrically connected to the internal electrodes, wherein the step of forming the external terminal electrode preferably includes a step of forming a plating layer on the exposed surfaces of the internal electrodes in the component main body a step of subjecting the component main body with the plating layer formed thereon to a heat treatment at a temperature of about 1000° C. or more, for example, and the average rate of temperature increase from room temperature to a top temperature of about 1000° C. or more is controlled to about 100° C./min or more, for example, in the heat treatment step.

A laminated ceramic electronic component according to another preferred embodiment of the present invention preferably includes a component main body including a plurality of stacked ceramic layers and internal electrodes provided therein, the internal electrodes being partially exposed, and an external terminal electrode provided on an outer surface of the component main body and being electrically connected to the internal electrodes, wherein the external terminal electrode includes a plating layer provided on the exposed surfaces of the internal electrodes in the component main body. The plating layer preferably has a surface area ratio of about 1.01 or more, for example. The plating layer with this surface area ratio is preferably the lowest base plating layer provided on the component main body when a plurality of plating layers are arranged in a stack.

The surface area ratio is represented by the following equation, surface area ratio=three-dimensional area/two-dimensional area. In this equation, the two-dimensional area refers to the area of a measurement field and the three-dimensional area refers to a surface area including the depth (in other words, irregularity) of the measurement field. Therefore, the surface area ratio of 1 means completely planar without any surface roughness, and as the area ratio increases, the surface roughness or irregularity increases.

According to a preferred embodiment of the present invention, the average rate of temperature increase from room temperature to the top temperature of about 1000° C. or more is preferably controlled to about 100° C./minute or more, for example, in the heat treatment step at the temperature of about 1000° C. or more. Thus, the plating layer is prevented from being melted while maintaining the bonding strength between the plating layer and the component main body. Therefore, the surface area ratio of the plating layer is maintained, and the adhesion force to a plating layer provided thereon is further increased.

Preferably, the plating layer including copper, for example, as its main constituent further increases the bonding strength between the plating layer and the component main body because copper is intrinsically a metal which has good bonding properties to ceramics.

In the laminated ceramic electronic component according to a preferred embodiment of the present invention, when an interdiffusion region from which both the metal constituent included in the plating layer and the metal constituent included in the internal electrodes are detected is provided in a boundary section between the plating layer and the internal electrodes, so as to extend to both the plating layer side and the internal electrode side, and to preferably extend to a position of about 2 μm or more, for example, away from the exposed surfaces of the internal electrodes in the component main body on the internal electrode side, it is confirmed that the effect of the heat treatment described above is sufficiently provided.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
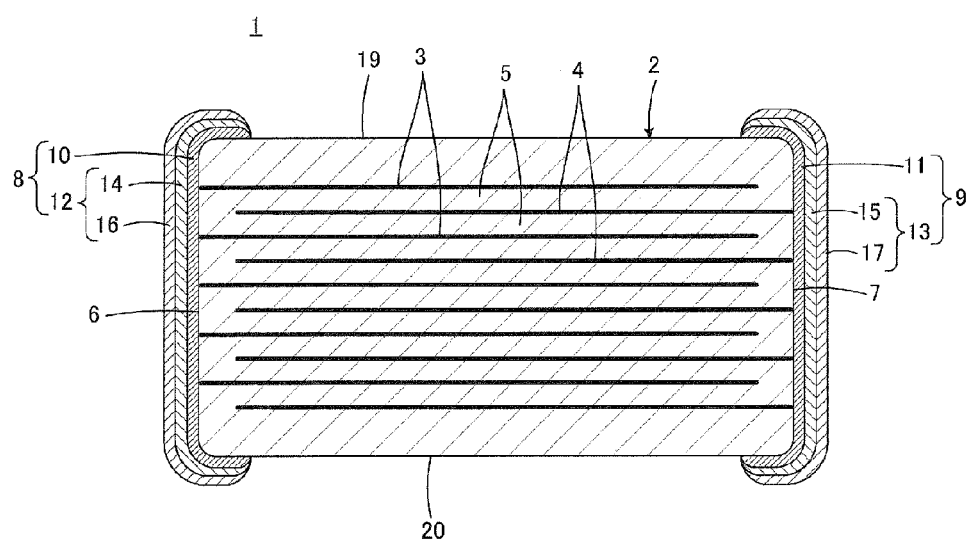
FIG. 1 is a cross-sectional view illustrating a laminated ceramic electronic component manufactured in accordance with a manufacturing method according to a preferred embodiment of the present invention.

A laminated ceramic electronic component 1 according to preferred embodiments of the present invention and a manufacturing method therefor will be described with reference to FIGS. 1 and 2.

The laminated ceramic electronic component 1 preferably includes a component main body 2 having a stacked structure. The component main body 2 includes a plurality of internal electrodes 3 and 4 provided therein. More specifically, the component main body 2 includes a plurality of stacked ceramic layers 5 and a plurality of layered internal electrodes 3 and 4 arranged along the interfaces between the ceramic layers 5. The internal electrodes 3 and 4 preferably include, for example, nickel as a main constituent.

When the laminated ceramic electronic component 1 defines a laminated ceramic capacitor, the ceramic layers 5 are preferably made of a dielectric ceramic, for example. It is to be noted that the laminated ceramic electronic component 1 may define other components, such as an inductor, a thermistor, or a piezoelectric component, for example. Therefore, depending on the function of the laminated ceramic electronic component 1, the ceramic layers 5 may preferably be made of a magnetic ceramic, a semiconductor ceramic, a piezoelectric ceramic, other suitable ceramics, for example, in addition to a dielectric ceramic.

The ends of the plurality of internal electrodes 3 and the ends of the plurality of internal electrodes 4 are respectively exposed at the end surfaces 6 and 7 of the component main body 2, and external terminal electrodes 8 and 9 are provided respectively so as to electrically connect the respective ends of the internal electrodes 3 and the respective ends of the internal electrodes 4 to each other.

It is to be noted that while the laminated ceramic electronic component 1 shown in FIG. 1 preferably is a two-terminal type component including the two external terminal electrodes 8 and 9, preferred embodiments of the present invention may also be applied to multi-terminal type laminated ceramic electronic components, for example.

Each of the external terminal electrodes 8 and 9 preferably includes first plating layers 10 and 11 formed by plating directly on the exposed surfaces of the internal electrodes 3 and 4, that is, on the end surfaces 6 and 7 of the component main body 2, and second plating layers 12 and 13 formed on the first layers 10 and 11, respectively.

The first plating layers 10 and 11 are provided respectively to electrically connect the plurality of internal electrodes 3 and 4 to each other, and preferably include copper, for example, as a main constituent. On the other hand, the second plating layers 12 and 13 are provided to improve the mountability of the laminated ceramic electronic component 1, and respectively preferably include solder barrier layers 14 and 15 made of plating layers including, for example, nickel as their main constituent, and include solderability providing layers 16 and 17 made of plating layers including, for example, tin or gold as their main constituent, which are formed on the solder barrier layers 14 and 15 so as to provide solderability. It is to be noted that examples of the plating including tin as its main constituent also include, for example, Sn—Pb solder plating, and examples of the plating including nickel as its main constituent also include Ni—P plating provided by electroless plating.

As described above, when the first plating layers 10 and 11 include as their main constituents, copper, for example, which provides favorable throwing power in the case of plating processing, the efficiency of the plating process is improved, and the bonding strength of the external terminal electrodes 8 and 9 is increased.

The plating method for forming the first plating layers 10 and 11 and the second plating layers 12 and 13 may preferably be an electroless plating method to deposit metal ions using a reducing agent, or may preferably be an electrolytic plating method through a process of applying an electric current.

Next, a method for manufacturing the laminated ceramic electronic component 1 according to a preferred embodiment of the present invention as shown in FIG. 1, in particular, a method for forming the external terminal electrodes 8 and 9 will be described.

First, the component main body 2 is manufactured in accordance with a well known method. Next, the external terminal electrodes 8 and 9 are formed respectively on the end surfaces 6 and 7 of the component main body 2 so as to be electrically connected to the internal electrodes 3 and 4.

For the formation of the external terminal electrodes 8 and 9, the first plating layers 10 and 11 are first formed on the end surfaces 6 and 7 of the component main body 2. In the component main body 2 before the plating, the plurality of internal electrodes 3 exposed at the one end surface 6 are electrically insulated from each other and the plurality of internal electrodes 4 exposed at the other end surface 7 are electrically insulated from each other. To form the first plating layers 10 and 11, metal ions in a plating solution are preferably first deposited on the respective exposed sections of the respective internal electrodes 3 and 4. Then, the plated depositions are further grown to physically connect the plated depositions on the respective exposed sections of the adjacent internal electrodes 3 and the plated depositions on the respective exposed sections of the adjacent internal electrodes 4. In this manner, the first plating layers 10 and 11 are formed to be homogeneous and dense.

In this preferred embodiment, the main component main body 2 of the laminated ceramic electronic component 1 preferably has a substantially rectangular parallelepiped shape, for example, which includes a pair of principal surfaces 19 and 20 opposed to each other, a pair of side surfaces opposed to each other (not shown in FIG. 1), and the pair of end surfaces 6 and 7 described above.

Further, preferably, the first plating layers 10 and 11 described above are formed respectively on the pair of end surface 6 and 7, and configured so that the end edges of the first plating layers 10 and 11 are located on the pair of principal surfaces 19 and 20 and the pair of side surfaces, which are adjacent to the end surfaces 6 and 7.

As described above, in order to allow the first plating layers 10 and 11 to be efficiently formed so that the end edges of the first plating layers 10 and 11 extend to the pair of principal surfaces 19 and 20 and the pair of side surfaces, dummy conductors may preferably be formed on ends of the principal surfaces 19 and 20 of the component main body 2, which are adjacent to the edge surfaces 6 and 7 and/or in an outer layer section of the component main body 2, although not shown. These dummy conductors do not substantially contribute to the development of electrical properties, but function to provide the deposition of metal ions for the formation of the first plating layers 10 and 11 and to promote the plating growth.

Before the plating step described above, the end surfaces 6 and 7 of the component main body 2 are preferably subjected to a polishing process in order to sufficiently expose the internal electrodes 3 and 4 at the end surfaces 6 and 7. In this case, when the end surfaces 6 and 7 are subjected to the polishing process to such an extent that the respective exposed ends of the internal electrodes 3 and 4 project from the end surfaces 6 and 7, the respective exposed ends are extended in a planar direction, and the energy required for plating growth is reduced.

Next, the component main body 2 including the first plating layers 10 and 11 is subjected to a heat treatment. As the heat treatment temperature, a temperature of about 1000° C. or more, for example, is preferably used. The state after this heat treatment is shown in FIG. 2. FIG. 2 shows the internal electrode 3 and the first plating layer 10.

Figure 2:
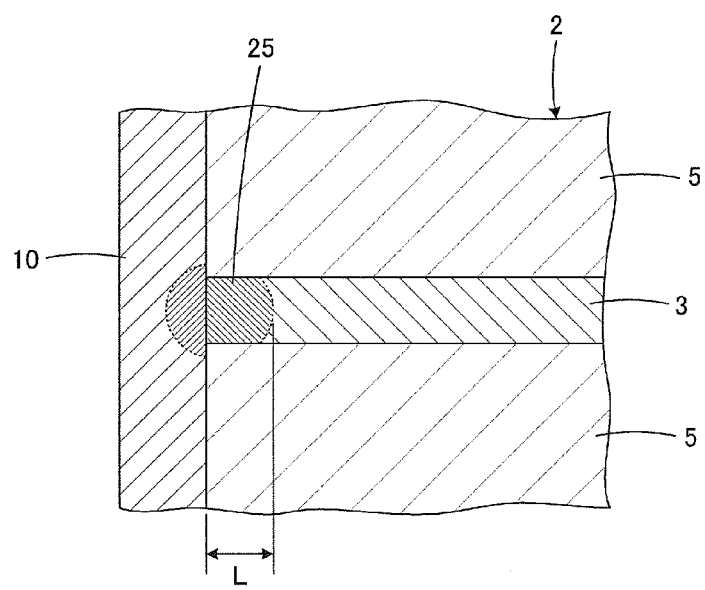
FIG. 2 is an enlarged cross-sectional view illustrating a portion of a component main body provided with a first plating layer formed thereon and then subjected to a heat treatment to form an external terminal electrode, in the manufacturing process of the laminated ceramic electronic component shown in FIG. 1.
Figure 3:
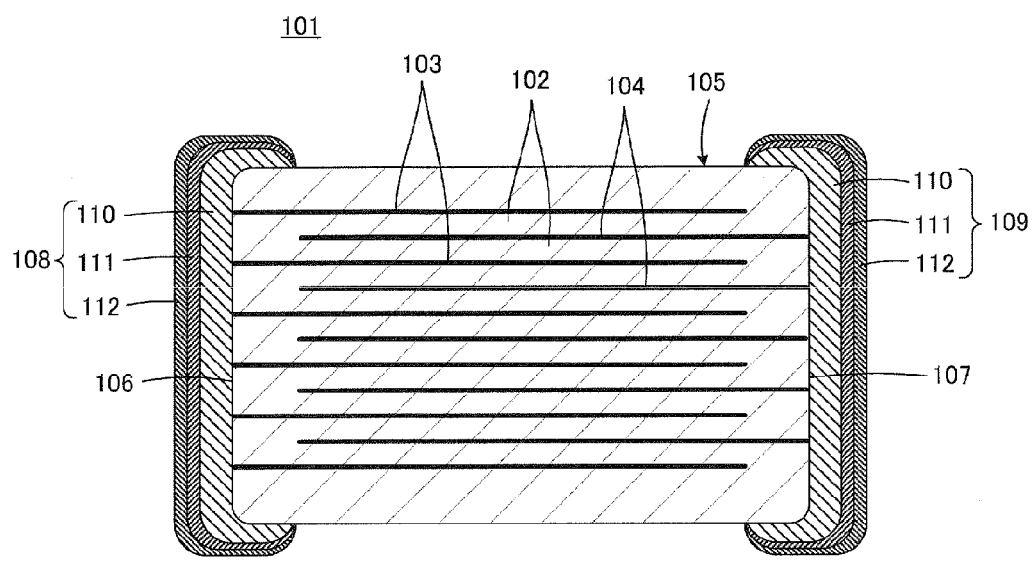
FIG. 3 is a cross-sectional view of a conventional laminated ceramic electronic component.

The internal electrode 4 and the first plating layer 11, which are not shown in FIG. 2, have substantially the same configuration as the configuration of the internal electrode 3 and first plating layer 10 shown in FIG. 2, and a description of the configuration is omitted accordingly.

Referring to FIG. 2, an interdiffusion region 25 is provided between the internal electrode 3 and the first plating layer 10. This interdiffusion region 25 is preferably located in a region with a length L of about 2 µm or more, for example, from the boundary between the internal electrode 3 and the first plating layer 10. In other words, the heat treatment is preferably performed under conditions that provide the length L of about 2 µm or more, for example. The volume expansion of the metal caused in the interdiffusion region 25 can thus advantageously fill gaps which may be present at the interfaces between the ceramic layers 5 and each of the internal electrode 3 and the first plating layer 10, so as to prevent moisture penetration into the component main body 2.

In addition, since the heat treatment described above is preferably performed at a temperature of not less than about 1000° C., for example, which is the eutectic temperature of the metal defining the first plating layers 10 and 11, the bonding strength can be also improved at the interfaces between the ceramic defining the stacked ceramic layers 5 with the internal electrodes 3 and 4 interposed therebetween and the first plating layers 10 and 11 in the component main body 2. For this reason, the step of maintaining a top temperature of about 1000° C. or more, for example, is preferably performed in the heat treatment.

However, when the heat treatment is performed at a temperature of about 1000° C. or more, there is a possibility that the metal defining the first plating layers 10 and 11 which includes copper, for example, as their main constituent may be partially melted. As a result, there is a possibility that when the laminated ceramic electronic component 1 is mounted on a circuit board (not shown) using solder, for example, the bonding strength to the circuit board may be decreased. In addition, there is also a possibility that the adhesion force of the second plating layers 12 and 13 formed on the first plating layers 10 and 11 may be somewhat decreased with respect to the first plating layers 10 and 11.

Figure 4:
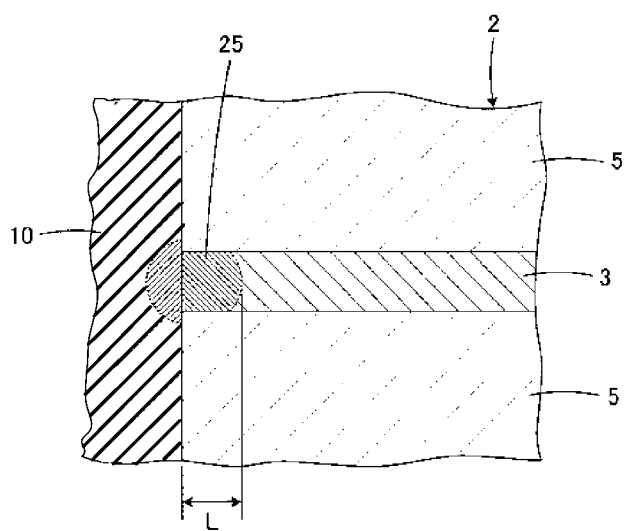
FIG. 4 is another enlarged cross-sectional view illustrating a portion of a component main body provided with a first plating layer having a surface area ratio of about 1.01 or more provided thereon.

Thus, the average rate of temperature increase from room temperature to the top temperature of about 1000° C. or more, for example, is preferably controlled to about 100° C./min or more, for example, in the heat treatment step. This average rate of temperature increase prevents the metal defining the first plating layers 10 and 11 from being melted while maintaining the bonding strength between the first plating layers 10 and 11 and the component main body 2. Therefore, as can be seen from an experimental example described below and as shown in FIG. 4, the surface area ratio of the first plating layers 10 and 11 can preferably be maintained at about 1.01 or more, and therefore, the adhesion force can be further increased between the second plating layers 12 and 13 described below.

Next, the second plating layers 12 and 13 are preferably formed. The second plating layers 12 and 13 can be formed by a known method, since the first plating layers 10 and 11 have already been formed. This is because the portion to be plated has a conductive continuous surface at the stage of forming the second plating layers 12 and 13.

In this preferred embodiment, the step of forming the solder barrier layers 14 and 15 preferably made of, for example, nickel and the step of forming the solderability providing layers and 17 preferably made of, for example, tin or gold are sequentially performed in order to form the second plating layers 12 and 13.

An experimental example will be described below, which was performed in order to determine the scope of the present invention and to confirm the advantageous effects of the present invention.

As component main bodies of laminated ceramic electronic components for samples, a component main body of a laminated ceramic capacitor with a length of about 0.94 mm, a width of about 0.47 mm, and a height of about 0.47 mm was prepared which had ceramic layers including a barium titanate based dielectric ceramic and internal electrodes including nickel as their main constituent. In the component main body, the number of stacked ceramic layers was 220, and each of the ceramic layers had a thickness of about 1.5 μm. In addition, the laminated ceramic capacitor as a finished product was designed to provide a capacitance of about 2.2 μF and a rated voltage of about 6.3 V.

Next, 500 of the component main bodies were placed into a 300-milliliter horizontal rotating barrel, and 100 milliliters of media having a diameter of about 0.7 mm was placed in the rotating barrel. Then, the rotating barrel was immersed in a copper plating bath at a bath temperature of about 25° C. with its pH was adjusted to about 8.7, and while rotating the barrel at a barrel peripheral speed of about 2.6 m/min, an electric field was applied at a current density of about 0.5 A/dm$^2$ to form copper plating layers with a film thickness of about 1 μm directly onto end surfaces of the component main bodies with the internal electrodes exposed at the end surfaces. It is to be noted that the copper plating bath included about 14 g/liter of copper pyrophosphate, about 120 g/liter of pyrophosphoric acid, and about 10 g/liter of dipotassium oxalate.

Next, the component main bodies with the copper plating layers formed as described above were heated from room temperature to a top temperature of about 1065° C. at rates of temperature increase as shown in Table 1 under an atmosphere with an oxygen concentration of about 100 ppm, and maintained at the top temperature for about 1 minute.

TABLE 1

| Sample Number | Rate of Temperature Increase [° C./min] |
|---|---|
| 1 | 100 |
| 2 | 150 |
| 3 | 200 |
| 4 | 250 |

TABLE 1-continued

| Sample Number | Rate of Temperature Increase [° C./min] |
|---|---|
| 5 | 300 |
| 6 | 350 |
| 7 | 400 |
| 8 | 450 |
| 9 | 500 |
| 10 | 10 |
| 11 | 20 |
| 12 | 50 |
| 13 | 80 |

In Table 1, the rate of temperature increase is about 100° C./min or more for samples 1 to 9, whereas the rate of temperature increase is less than about 100° C./min for samples 10 to 13.

The laminated ceramic capacitors obtained with the method described above according to each sample were evaluated in terms of surface area ratio and bonding strength.

The surface area ratio (S ratio) was evaluated in accordance with tapping AFM with the use of a system "SPA 400" from SII NanoTechnology Inc., to determine the ratio of three-dimensional area/two-dimensional area in the measurement field as the surface area ratio. The measured view was determined as a region of about 50 μm×about 50 μm around the center of a cross section defined by the width dimension and thickness dimension of the laminated ceramic capacitor according to the sample.

The bonding strength was evaluated by applying a load causing a shear fracture to the laminated ceramic capacitor according to the sample. More specifically, the laminated ceramic capacitors according to each sample were mounted on substrates by soldering, a load was applied in parallel to the both external terminal electrodes at a loading speed of about 0.5 mm/sec until a fracture was caused, and the fracture mode (fracture point) was observed when a fracture was caused.

The results are shown in Table 2.

TABLE 2

| Sample Number | Surface Area Ratio | Fracture Mode (Fracture Point) |
|---|---|---|
| 1 | 1.011 | Component Main Body |
| 2 | 1.023 | " |
| 3 | 1.021 | " |
| 4 | 1.022 | " |
| 5 | 1.035 | " |
| 6 | 1.036 | " |
| 7 | 1.032 | " |
| 8 | 1.041 | " |
| 9 | 1.040 | " |
| 10 | 1.007 | Component Main Body/Plating Layer Interface |
| 11 | 1.007 | Component Main Body/Plating Layer Interface |
| 12 | 1.008 | Component Main Body/Plating Layer Interface |
| 13 | 1.008 | Component Main Body/Plating Layer Interface |

None of the samples 1 to 9 obtained from the rate of temperature increase of about 100° C./min or more caused any fracture at the interfaces between the component main body and the copper plating layers, with the fracture points in the component main body, and the samples 1 to 9 were able to sufficiently ensure the bonding strength of the copper plating layer to the component main body. This result is presumed to be because a moderate eutectic state was maintained in the copper plating layers. In addition, each of the samples 1 to 9 maintained a surface area ratio of about 1.01 or more. This result is presumed to be because the copper plating layers were prevented from being melted.

On the other hand, the samples 10 to 13 obtained from the rate of temperature increase of less than about 100° C./min caused fractures at the interfaces between the component main body and the copper plating layers, which were inferior in the bonding strength of the copper plating layer to the component main body. In addition, each of the samples 10 to 13 provided a surface area ratio of less than about 1.01. These results are presumed to be because the increased amount of time that was maintained around the eutectic temperature promoted melting of the copper plating layers.

Furthermore, in order to confirm the interdiffusion produced by the heat treatment described above in the boundary sections between the internal electrodes and the copper plating layers, the samples 1 to 9 were subjected to a WDX mapping analysis to analyze two-dimensional diffusion of metal elements. In this analysis, the "JXA 8500F" from JEOL Ltd. was used as a system, in which the accelerating voltage was set to about 15 kV, the illumination current was set to about 50 nA, the scanning electron microscope (SEM) was set to provide about a 5000-fold magnification, the accumulation time was set to about 40 ms, and primary rays of Kα characteristic X-rays were used as detection characteristic X-rays for Ni and Cu. The diffusion analyzed in this manner confirmed that the interdiffusion region was formed so as to extend to both the copper plating layer side and the internal electrode side, and to extend to a position of about 2 μm or more away from the exposed surfaces of the internal electrodes in the component main body on the internal electrode side.

It is to be noted that while copper was preferably used as the metal defining the plating layers in the experimental example described above, it has been confirmed that an alloy of copper and another metal also provides similar results as long as the alloy has a eutectic temperature of about 1000° C. or more.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated ceramic electronic component comprising:
   a component main body including a plurality of stacked ceramic layers and internal electrodes provided at interfaces between the plurality of stacked ceramic layers, the internal electrodes including exposed surfaces; and
   an external terminal electrode provided on an outer surface of the component main body and electrically connected to the internal electrodes; wherein
   the external terminal electrode includes a plating layer provided on the exposed surfaces of the internal electrodes in the component main body and on an end surface of the component main body at which both the internal electrodes and the ceramic layers are alternately exposed; and
   the plating layer has a surface area ratio of about 1.01 or more.

2. The laminated ceramic electronic component according to claim 1, wherein
   an interdiffusion region from which both a metal constituent included in the plating layer and a metal constituent included in the internal electrodes are detected is provided in a boundary section between the plating layer and the internal electrodes;
   the interdiffusion region extends to both a side of the plating layer and a side of the internal electrodes; and
   the interdiffusion region extends to a position of about 2 μm or more away from the exposed surfaces of the internal electrodes in the component main body.

3. The laminated ceramic electronic component according to claim 1, wherein the plating layer includes copper as a main constituent.

* * * * *